3,030,352
NEW CUPRIFEROUS TRISAZO DYESTUFFS AND A PROCESS FOR THEIR PREPARATION
Marcel Jirou, Sotteville-les-Rouen, and Vasili Urne, Rouen, France, assignors to Compagnie Francaise des Matieres Colorantes, Paris, France, a company of France
No Drawing. Filed Apr. 16, 1959, Ser. No. 806,760
9 Claims. (Cl. 260—145)

The present invention relates to the copper complexes of the trisazo dyestuffs of the general formula:

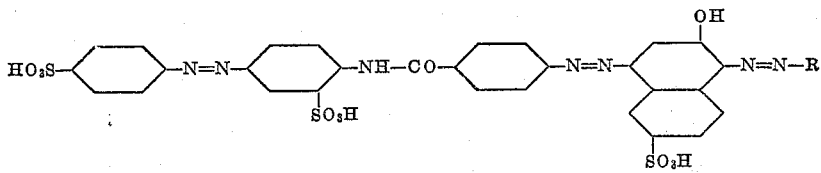

in which R represents the residue of an acylaminohydroxynaphthalene-sulphonic acid coupled in the ortho position to the hydroxyl group.

These complexes can be prepared by dealkylating metallisation of the dyestuffs of the general formula

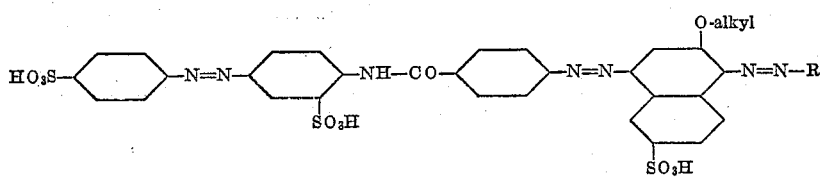

in which R has the same significance as above, by means of compounds of divalent copper. The O-alkyl group is converted into an hydroxyl group by hydrolysis and the copper becomes attached to the hydroxyl groups in the ortho-ortho' position to the azo linkage.

When R represents a radical of the formula

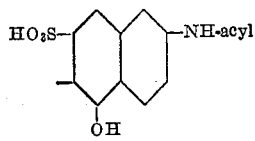

the excess copper which may possibly be present in the metallisation medium is fixed in its turn. For example, cupriferous compounds containing two atoms of copper per molecule of dyestuff may be obtained and the solubility of the latter is not thereby reduced. These 2:1 complexes can be used for the preparation of complexes containing only one atom of copper per molecule of trisazo dyestuff, and for this result it is sufficient to treat the dicupric compounds at 80° C. with a solution of the sequestering agent tetrasodium salt of ethylene diamine-tetra-acetic acid. This partial demetallisation may also be effected by simply mixing the sequestering agent with the isolated and dried dicupric compound or by addition of the same agent of the dyebath.

The cupriferous complexes containing one to two atoms of metal per molecule of trisazo compound are especially well suited for dyeing vegetable fibres in shades fast to light and to washing.

The following examples, in which the parts indicated are parts by weight, illustrate the present invention without restricting it.

*Example 1*

109.4 parts of the trisazo dyestuff of the formula

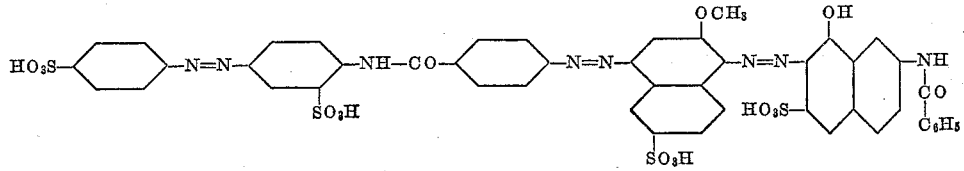

as the sodium salt are dissolved in 2400 parts of water at 90° C. This solution is treated with 10 parts of sodium bicarbonate. A solution of 30 parts of crystalline copper sulphate in 150 parts of water to which 56.5 parts of 20% by volume ammonia have been added, is slowly added. The mixture is heated for 10 hours at 90–92° C. and the metallised dyestuff is precipitated by the addition of sodium chloride, filtered and dried. This dyestuff only contains one atom of metal in its molecule. It dyes cellulosic fibres a bluish green shade.

*Example 2*

The dyestuff employed in Example I is replaced by the same weight of the trisazo compound of the formula:

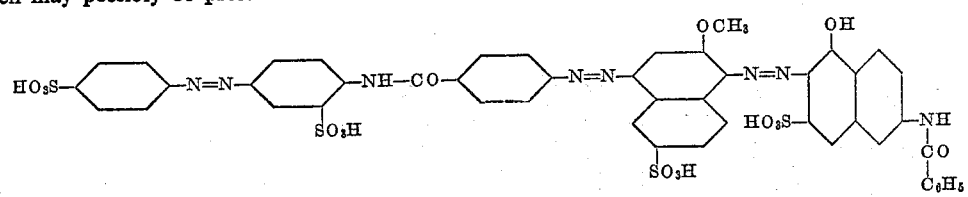

The procedure of Example 1 is followed, but 50 parts of copper sulphate are used instead of 30 parts. A cupric compound is obtained which contains two atoms of metal in its molecule and which dyes cellulosic fibres greenish blue.

*Example 3*

To the reaction mixture resulting from the metallisation described in Example 2 is added a concentrated solution of the tetrasodium salt of ethylenediamine-tetraacetic acid in such quantity that its concentration in the mixture is equal to 1%. After 30 minutes' agitation at 80–85° C., the dyestuff is isolated by the addition of sodium chloride. The copper complex obtained only contains one atom of metal per molecule of azo dyestuff. It dyes cellulosic fibres a shade which is a little bluer than that given by the dicupric compound.

*Example 4*

The copper complex of the trisazo dyestuff of the formula:

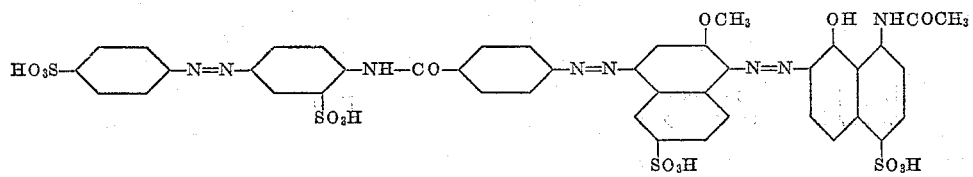

is prepared according to the directions in Example 1. The dyestuff obtained only contains one atom of copper in the molecule and dyes cellulosic fibres green.

We claim:
1. Cupriferous derivatives of trisazo dyestuffs of the general formula:

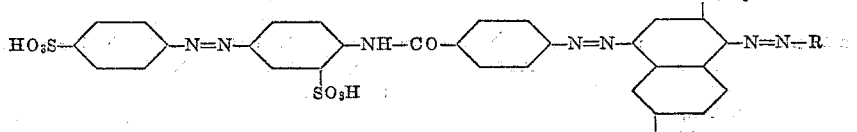

in which R represents a member selected from the group consisting of the acetylamino-1-hydroxy-monosulpho-2-naphthyl, methoxy - carbonylamino-1-hydroxy - monosulpho-2-naphthyl, ethoxycarbonylamino-1-hydroxy - monosulpho-2-naphthyl and benzoylamino-1-hydroxy-monosulpho-2-naphthyl groups, which derivatives contain one to two atoms of copper per molecule of dyestuff, one of them forming a coordination complex with the o:o'-dihydroxy-azo grouping resulting from the hydrolysis of the o-methoxy-o'-hydroxy-azo-grouping.

2. Cupriferous derivatives of trisazo dyestuffs of the general formula:

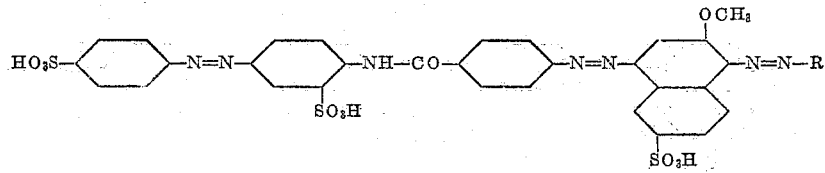

in which R represents a member selected from the group consisting of the acetylamino-1-hydroxy-monosulpho-2-naphthyl, methoxy - carbonylamino-1-hydroxy - monosulpho-2-naphthyl, ethoxycarbonylamino-1-hydroxy - monosulpho-2-naphthyl and benzoylamino-1-hydroxy-monosulpho-2-naphthyl groups, which derivatives contain one to two atoms of copper per molecule of dyestuff, one of them forming a coordination complex with the o:o'-dihydroxy-azo grouping resulting from the hydrolysis of the o-methoxy-o'-hydroxy-azo-grouping.

3. The cupriferous complex of the trisazo dyestuff of the formula:

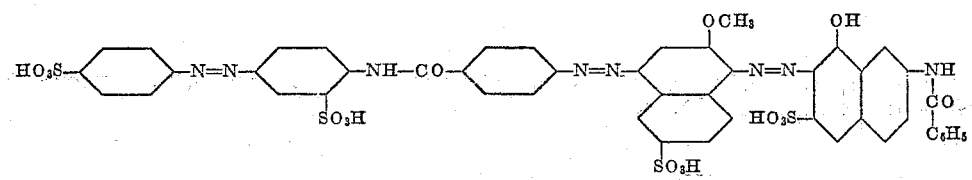

in which an atom of divalent copper is attached to the dyestuff by the o.o'-methoxy group.

4. The cupriferous complex of the trisazo dyestuff of the formula:

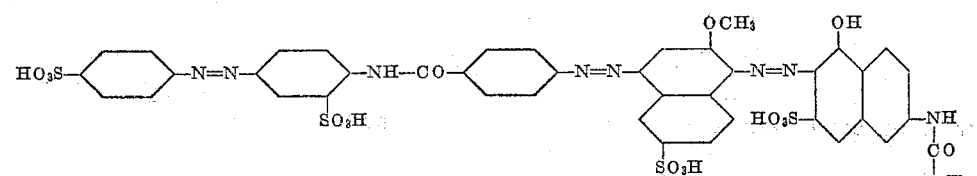

in which at atom of divalent copper is attached to the dyestuff by the o.o'-methoxy group.

5. The cupriferous complex of the trisazo dyestuff of the general formula:

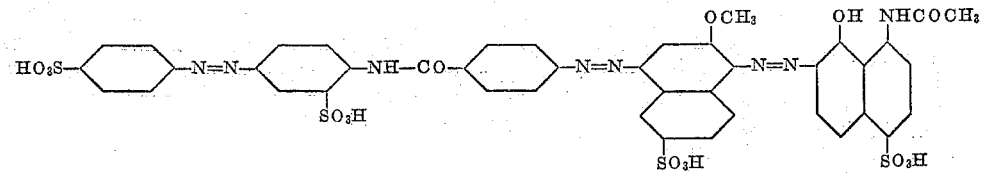

in which an atom of divalent copper is attached to the dyestuff by the o.o'-methoxy group.

6. Cupriferous derivatives of the trisazo dyestuff of the formula:

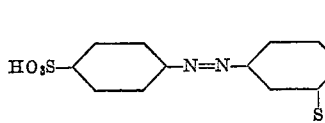

containing two atoms of copper.

7. A process for the preparation of a cupriferous complex containing 1 atom of copper per molecule which comprises effecting a dealkylating coppering of a dyestuff of the general formula:

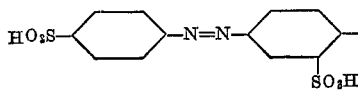

in which R represents a member selected from the group consisting of the acetylamino-1-hydroxy-monosulpho-2-naphthyl, methoxy - carbonylamino-1-hydroxy - monosulpho-2-naphthyl, ethoxycarbonylamino-1-hydroxy - mono- sulpho-2-naphthyl and benzoylamino-1-hydroxymonosulpho-2-naphthyl groups by reacting said dyestuff in a heated alkaline medium with a compound of divalent copper in the ratio of 1 atom of copper per molecule of dyestuff.

8. A process for the preparation of a cupriferous complex containing 1 atom of copper per molecule of dyestuff which comprises effecting a dealkylating coppering of a dyestuff of the general formula:

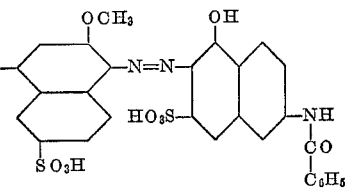

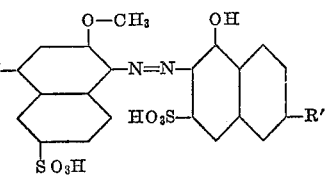

R' represents a member selected from the group consisting of the acetylamino, methoxy-carbonylamino, ethoxy-carbonylamino and benzoylamino groups in the presence of excess copper, and then effecting a demetallisation of the dicupric derivative by treating said compound with a heated solution of the tetrasodium salt of ethylene-diamine-tetra-acetic acid in an alkaline medium.

9. A process as claimed in claim 8 in which the demetallisation in an alkaline medium is effected by means of an aqueous solution of the tetrasodium salt of ethylenediamine tetra-acetic acid.

References Cited in the file of this patent
UNITED STATES PATENTS

| | | |
|---|---|---|
| 1,901,393 | Glietenberg | Mar. 14, 1933 |
| 2,381,599 | Krebser et al. | Aug. 7, 1945 |
| 2,779,756 | Riat | Jan. 29, 1957 |
| 2,794,798 | Durig | June 4, 1957 |
| 2,817,656 | Bissell | Dec. 24, 1957 |
| 2,834,773 | Scalera | May 13, 1958 |

FOREIGN PATENTS

| | | |
|---|---|---|
| 955,715 | Germany | Jan. 10, 1957 |

OTHER REFERENCES

Taylor, A.: "Organic Chelating Agents as Aids to Industry," Chemistry and Industry, No. 41, Oct. 20, 1956, pages 1131–1135.